US012451611B2

(12) United States Patent
Massman et al.

(10) Patent No.: US 12,451,611 B2
(45) Date of Patent: Oct. 21, 2025

(54) 3D PRINTED METALLIC DUAL-POLARIZED VIVALDI ARRAYS ON SQUARE AND TRIANGULAR LATTICES

(71) Applicant: Government of the United States, as represented by the Secretary of the Air Force, Wright-Patterson AFB, OH (US)

(72) Inventors: Jeffrey Massman, Dayton, OH (US); Carl Pfeiffer, Beavercreek, OH (US); Steffen Thomas, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 179 days.

(21) Appl. No.: 18/303,679

(22) Filed: Apr. 20, 2023

(65) Prior Publication Data

US 2023/0395983 A1 Dec. 7, 2023

Related U.S. Application Data

(60) Provisional application No. 63/347,880, filed on Jun. 1, 2022.

(51) Int. Cl.
*H01Q 13/10* (2006.01)
*B33Y 80/00* (2015.01)
(Continued)

(52) U.S. Cl.
CPC ............ *H01Q 13/106* (2013.01); *B33Y 80/00* (2014.12); *H01Q 1/48* (2013.01); *H01Q 21/24* (2013.01);
(Continued)

(58) Field of Classification Search
CPC ........ H01Q 13/106; H01Q 1/48; B33Y 80/00; H01R 24/40; H01R 2201/02
See application file for complete search history.

(56) References Cited

U.S. PATENT DOCUMENTS 5,557,291 A * 9/1996 Chu .................... H01Q 13/085 343/768
9,614,290 B1 4/2017 Remski
(Continued)

OTHER PUBLICATIONS

Pasternack. (2014). SMP Male Smooth Bore Connector Solder Attachment Thread-In Mount Pin Terminal Catchers Mitt Design Pre-Tinned Pin Technical Data Sheet (Year: 2014).*
(Continued)

*Primary Examiner* — Hai V Tran
*Assistant Examiner* — Austin M Back
(74) *Attorney, Agent, or Firm* — AFMCLO/JAZ; John T. Addicks

(57) ABSTRACT

A 3-D printable dual-polarized Vivaldi array may include a plurality of Vivaldi antennas having a 3-D printed modular construction that meets direct metal laser sintering fabrication design rules; a plurality of Sub-Miniature Push-on, Micro (SMPM) connectors forming a plurality of ground plane skirts supporting a lattice, each SMPM Connector having a detent. The 3-D printable dual-polarized Vivaldi array may further include a support structure between the lattice and the ground plane skirt; the ground plane skirt having a skirt swept forward angle of 40 to 60 degrees.

9 Claims, 7 Drawing Sheets

(51) Int. Cl.
*H01Q 1/48* (2006.01)
*H01Q 21/24* (2006.01)
*H01R 24/40* (2011.01)

(52) U.S. Cl.
CPC ......... *H01R 24/40* (2013.01); *H01R 2201/02* (2013.01)

(56) References Cited

U.S. PATENT DOCUMENTS

| | | | | |
|---|---|---|---|---|
| 2017/0125918 | A1 | 5/2017 | Howard | |
| 2018/0262264 | A1 | 9/2018 | Alexander | |
| 2021/0050674 | A1* | 2/2021 | Chang | H01Q 13/02 |
| 2021/0376463 | A1* | 12/2021 | Massman | H01Q 5/25 |

OTHER PUBLICATIONS

Rick W. Kindt and John T. Logan; Benchmarking Ultrawideband Phased Antenna Arrays; IEEE Antennas & Propagation Magazine, 1045-9243/18 © 2018 IEEE Jun. 2018 p. 34-37.
Anders Ellgardt and Andreas Wikstrom; A Single Polarized Triangular Grid Tapered-Slot Array Antenna; IEEE Transactions on Antennas and Propagation, vol. 57, No. 9, Sep. 2009 p. 2599-2607.
Rick W. Kindt and Bradley T. Binder; Dual-Polarized Planar-Printed Ultrawideband Antenna Array on a Triangular Grid; IEEE Transactions on Antennas and Propagation, vol. 68, No. 8, Aug. 2020, p. 6136-6144.
Kindt, Rick W. et al., Dual-Polarized Vivaldi Array on a Triangular Lattice, IEEE Transactions on Antennas and Propagation, vol. 69, No. 4, Apr. 2021.

* cited by examiner

3D PRINTED METALLIC DUAL-POLARIZED VIVALDI ARRAYS ON SQUARE AND TRIANGULAR LATTICES

Pursuant to 37 C.F.R. § 1.78(a)(4), this application claims the benefit of and priority to prior filed Provisional Application Ser. No. 63/347,880, filed 1 Jun. 2022, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to 3D printing of antennas and, more particularly, to the antenna design changes used to facilitate 3D printing.

BACKGROUND OF THE INVENTION

Active electronic scanning arrays (AESAs) with ultra-wide bandwidths are appealing for space constrained platforms because they can be used for a multitude of missions such as radar, communication, and direction finding all within a single aperture. A myriad of ultra-wideband (UWB) antenna geometries have been investigated which offer tradeoffs between bandwidth, polarization purity, fabrication complexity, and efficiency. Some examples include tightly coupled dipoles and slots, Planar Ultrawideband Modular Antenna (PUMA), Balanced Antipodal Vivaldi Array (BAVA), Frequency-scaled Ultra-wide Spectrum Element (FUSE), and Sliced Notch Array. Vivaldi antennas (also known as notch antennas) are attractive since they are simple to design and can offer a good impedance match over a decade of bandwidth and wide scan angles past 60o from normal. However, they are quite thick and have high cross-polarization when scanning in the D-plane. Furthermore, they are often fabricated using electronic discharge machining or hand soldering a printed-circuit-board (PCB) grid together, which are expensive and time-consuming processes.

These fabrication challenges motivate the development of low-cost additively manufactured (i.e. 3D printed) Vivaldi arrays. Metal plated plastics typically have poor durability and temperature handling. Printing the antenna directly from metal using direct metal laser sintering (DMLS) is an attractive alternative to metal plated plastics. A multitude of microwave components were fabricated using DMLS techniques. Here, we propose using metal 3D printing to fabricate ultra-wideband (UWB) arrays. This fabrication process is especially useful for research and development since customized designs can be cheaply built to order with short lead times. However, 3D metal printers have special design rules that need to be satisfied which are typically more stringent than plastic printers. Satisfying these design rules often requires significant modifications of the geometry and then re-optimization. Therefore, it is an improvement to modify the standard Vivaldi geometry to be amendable to metal 3D printing, and then evaluate how these changes affect performance.

The vast majority of UWB antenna arrays utilize a square lattice, which is a natural geometry for integrating a vertical and horizontally polarized radiating element within a unit cell. However, it is well known that a triangular lattice offers 15.5% larger unit cell area for grating lobe free operation, which corresponds to a 0.6 dB larger gain for the same number of elements. Furthermore, a triangular lattice is often easier to fit within an arbitrary aperture shape on planar and/or curved surfaces. These advantages have motivated the development of many triangular lattice arrays, most of which are narrowband.

Extending this concept to a dual-polarizations is not trivial. Aside from slightly increased insertion loss and increased orthogonal port coupling, the triangular lattice PUMA performs similar to the square lattice version.

SUMMARY OF THE INVENTION

The present invention overcomes the foregoing problems and other shortcomings, drawbacks, and challenges of antenna design changes used to facilitate 3D printing. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a 3-D printable dual-polarized Vivaldi array may include a plurality of Vivaldi antennas having a 3-D printed modular construction that meets direct metal laser sintering fabrication design rules; a plurality of Sub-Miniature Push-on, Micro (SMPM) connectors forming a plurality of ground plane skirts (at least one ground plane skirt) supporting a lattice, each SMPM Connector having a detent. The 3-D printable dual-polarized Vivaldi array may further include a support structure between the lattice and the ground plane skirt; the ground plane skirt having a skirt swept forward angle of 40 to 60 degrees.

In one embodiment the 3-D printable Vivaldi array may include a tapered transmission line balun further connects the Vivaldi antennas with their respective ground plane skirts. The 3-D printable Vivaldi array may further include ground plane skirts that are 3-D printed metal. The ground plane skirts are 3-D printed using direct metal laser sintering (DMLS). A Marchand balun further connects the Vivaldi antennas with their respective ground plane skirts. Generally, the ground plane skirts may be made of metal.

The 3-D printable Vivaldi array may further include a tapered transmission line balun converts the coaxial input connector into the balanced flared notch radiators.

The 3-D printable dual-polarized Vivaldi array manufacturing process wherein may include a plurality of Vivaldi antennas have a 3-D printed modular construction that meets direct metal laser sintering fabrication design rules; a plurality of Sub-Miniature Push-on, Micro (SMPM) connectors forming a plurality of ground plane skirts supporting a lattice, each SMPM Connector having a detent; a support structure between the lattice and the ground plane skirt. The ground plane skirt may have a skirt swept forward angle of 40 to 60 degrees printable Vivaldi array. The 3-D printed triangular lattice may have added a 3-D printed modular support structure and a perforated ground plane skirt; and have added coaxial input ports (at least one coaxial input port) to complete the 3-D printable Vivaldi array. The ground plane skirts may be 3-D printed metal.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The invention enables 3D Printing of Metallic Dual-Polarized Vivaldi Arrays on Square and Triangular Lattices. Here, we disclose the 3-D printing of Metallic Dual-Polarized Vivaldi (Vivaldi) arrays 3D printed onto square and triangular lattices with a first UWB array fabricated using all metal 3D printing and Sub-Miniature Push-on, Micro (SMPM) connectors. Where terms are herein discussed as about, about is defined as plus or minus 10% of the value presented.

Figure 1:
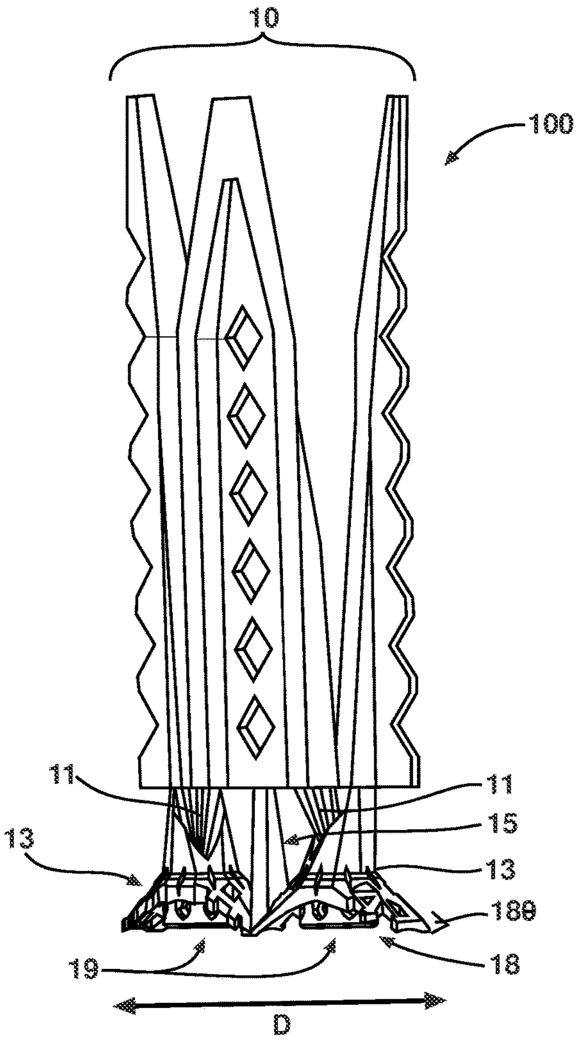
FIG. 1 Illustrates an exemplary Vivaldi array having a triangular lattice.

FIG. 1 illustrates a Vivaldi array antenna 100 having a triangular lattice 10, coax center conductor(s) 11, coax outer conductors 13 and a modular support structure(s) 15 and a perforated ground plane skirt 18. Two of at least two coaxial input ports 19 are also illustrated. The Vivaldi array may have a diameter D of any useful size. In one embodiment the diameter D may be from about 5 mm to about 30 mm. The perforated ground plane skirt 18 includes a skirt swept forward angle 10 of from about 35 degrees to about 60 degrees. In one embodiment the skirt angle 10 may be about 40 degrees to about 60 degrees. In one embodiment the skirt angle 180 may be about 40 degrees to about 50 degrees. In one embodiment the skirt angle 180 may be about 45 degrees.

Figure 2:
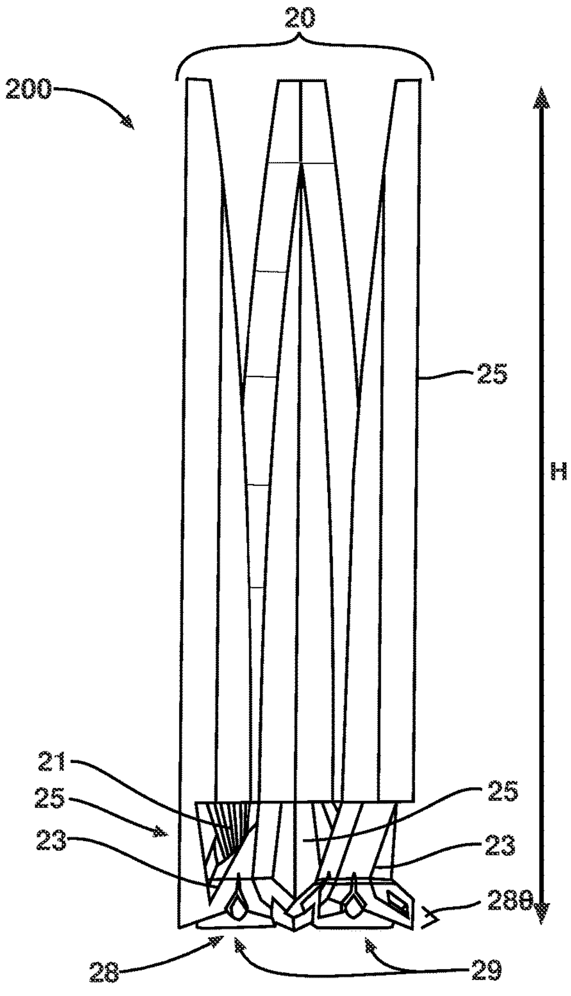
FIG. 2 Illustrates an exemplary Dual-Polarized Vivaldi array ground plane skirt.

FIG. 2 illiterates a Vivaldi array antenna 200 having a square lattice 20, coax center conductors 21, coax outer conductors 23 and a modular support structure 25 and a perforated ground plane skirt 28. Two coaxial input ports 29 are also illustrated. The Vivaldi array may have a height H of about 52 mm. The perforated ground plane skirt 28 includes a skirt swept forward angle 280 of from about 35 degrees to about 60 degrees. In one embodiment the skirt swept forward angle 280 may be about 40 degrees.

Figure 3A:
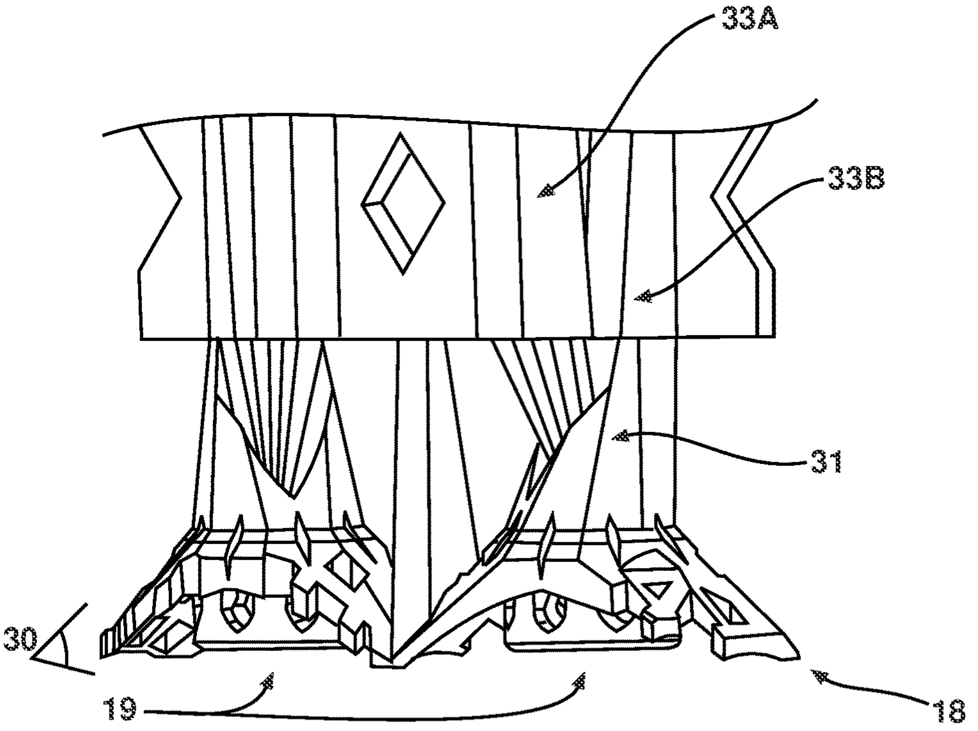
FIG. 3A Illustrates an exemplary Vivaldi array ground plane skirt.

FIG. 3A illustrates an expanded view of the perforated ground plane skirt 18 area of FIG. 1 showing the at least two coaxial input ports 19, and a portion of a first balanced flared notch radiator 33A and a portion of a second balanced flared notch radiator 33B wherein they start off close to each other at the bottom and then slowly separate until they terminate at the height H (Illustrated in FIG. 2). A tapered transmission line balun 31 converts the coaxial input port(s) 19 to the balanced flared notch radiator(s) 31. The balun 31 connects the coax input port 19 and the bottom of the first flared notch radiator 33A and the second flared notch radiator 33B. The ground plane skirt 18 includes a skirt swept forward angle 20. An outer coax 13 preferably has a swept forward angle θ of at least 40 degrees.

Figure 3B:
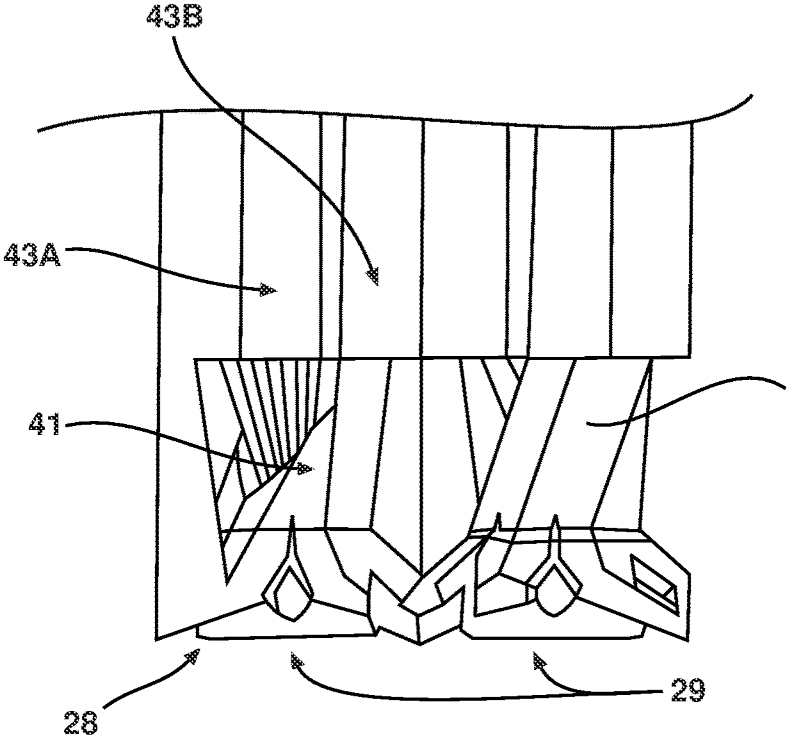
FIG. 3B Illustrates a second exemplary Vivaldi array ground plane skirt.

FIG. 3B illustrates an expanded view of the perforated ground plane skirt 28 area of FIG. 2 showing the at least two coaxial input ports 29, and a portion of a first balanced flared notch radiator 43A and a portion of a second balanced flared notch radiator 43B wherein they start off close to each other at the bottom and then slowly separate until they terminate at the height H (Illustrated in FIG. 2). A tapered transmission line balun 41 converts the coaxial input port(s) 29 to the balanced flared notch radiator(s) 31. The balun 41 connects the coax input port 29 and the bottom of the balanced flared notch radiator 43A and the second balanced flared notch radiator 43B.

Figure 4:
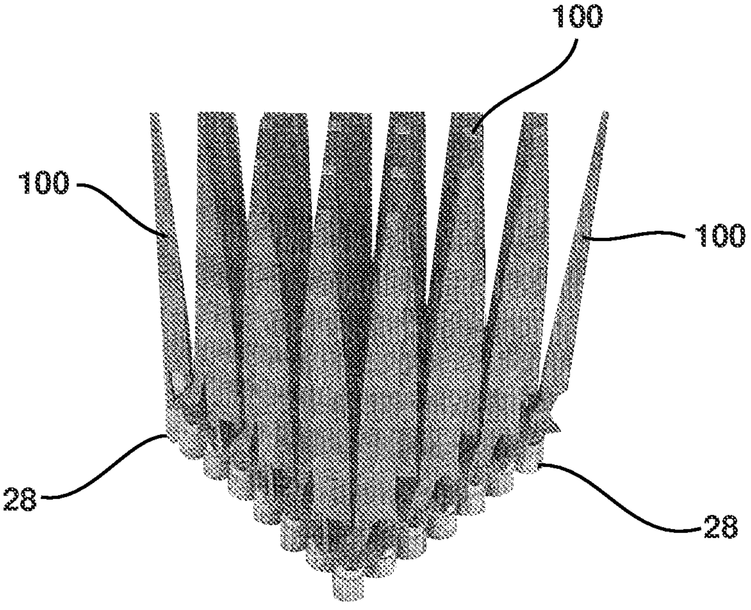
FIG. 4 illustrates a plurality of Vivaldi array antennas.

FIG. 4 illustrates a plurality of Vivaldi array antennas 100 fabricated together using 3-D manufacturing, each with a ground plane skirt 28. The Vivaldi arrays of FIG. 4 are monolithically fabricated using commercial, low-cost, 3D metal printing, also known as direct metal laser sintering with a dual-polarized Vivaldi array on a triangular lattice. The same process was used for a square lattice array as illustrated in FIG. 2.

The triangular lattice is attractive because it has about a 15.5% larger cell size compared to the square lattice and can be more naturally truncated into a wide range of aperture shapes such as a rectangle, hexagon, or triangle. Both arrays operate at 3-20 GHz and scan angles out to 60o from normal. The fabrication process delivers the antenna array ready for use directly after the standard printing process is complete. This rapid manufacturing is further expedited by printing the Sub-Miniature Push-on Micro (SMPM) connectors 19 and/or coaxial input ports 29) directly onto the Vivaldi array antenna 100 and 200), which simplifies assembly and reduces cost compared to utilizing discrete radio frequency (RF) connectors. The arrays have a modular design by slicing the individual antennas 100/200 (cells) off, or adding more. As well as adding an additional support structure 15 and 25 (FIG. 1 and FIG. 2 respectively) that allow for combining multiple subarrays together for arbitrarily increasing the aperture size. Simulations and measurement show that our arrays have similar performance as previously published Vivaldi arrays, but with simpler and less expensive fabrication.

In one embodiment a dual-polarized Vivaldi array on a triangular lattice may be monolithically fabricated exclusively using 3D metal printing or direct metal laser sintering. The fabrication process is significantly simplified compared to previously published Vivaldi arrays since the antenna is capable of use directly after the standard printing process is complete.

Vivaldi antennas (also known as notch antennas) are particularly attractive since they may offer a good impedance match over a up to 10 bandwidths and provide wide scan angles past 60 degrees from normal. However, they have been previously fabricated using electronic discharge machining or hand soldering a PCB grid together, which are expensive and time-consuming processes. Furthermore, all dual-polarized Vivaldi arrays to date utilize a square lattice. A triangular lattice offers 15.5% larger unit cell area for grating lobe free operation.

The antenna array is fabricated through an additive manufacturing processes. The developed antenna technology provides a low profile, ultra-wideband antenna array that can directly integrate into doubly conformal aircraft radome structures. It uses state of the art metal 3D printing fabrication for a lightweight and low-cost antenna array. The disposable platforms are designed to be low cost, and traditional antenna arrays are often extremely expensive and take up a lot of space.

The antenna design may be scaled in both frequency and size to address various operational requirements. Additionally, the all metal 3D printed UWB triangular lattice design is attractive for very high power ship AESA's.

This rapid 3D manufacturing of the antenna is further expedited by printing the "Sub-Miniature Push-on, Micro" (SMPM) connectors directly onto the radiating elements, which simplifies assembly and reduces cost compared to utilizing discrete RF connectors.

Dual-polarized Vivaldi arrays are distributed in an egg crate geometry which separates the feed points of the x and y polarizations. A top view of Vivaldi designs arranged on square and triangular lattice egg crate geometries are shown in FIG. 1. The onset of grating lobes occurs at 20 GHz when scanning to 90o from normal for both the square and triangular lattice geometries (i.e. λH=15 mm). Dual-polarized Vivaldi arrays require x and y directed arms to be orthogonal to each other, symmetric, and connected to neighboring elements to create the continuous transverse current that delivers ultra-wide bandwidth.

The square lattice array naturally satisfies these conditions because the antenna elements can simply be arranged along the unit cell lattice. However, it is not obvious how to satisfy these conditions on a triangular lattice.

Triangular lattices to date typically employ narrowband radiators that are isolated from each other such that the lattice geometry has minimal impact on the antenna design. However, UWB radiators require strong coupling between neighboring elements to realize bandwidth ratios exceeding 3:1. Therefore, the antenna element design is directly influenced by the lattice geometry. Side views of the designed unit cells on square and triangular lattices are shown in FIG. 2 and FIG. 3 respectively. In one embodiment the arrays may be from titanium due to its 3D printing accuracy and decent conductivity (σ=1.82×106 S/m). The input SMPM connector is 3D printed onto the antenna such that the antenna can be measured directly after 3D printing as unique to the present invention, no discrete components need to be attached.

Figure 5:
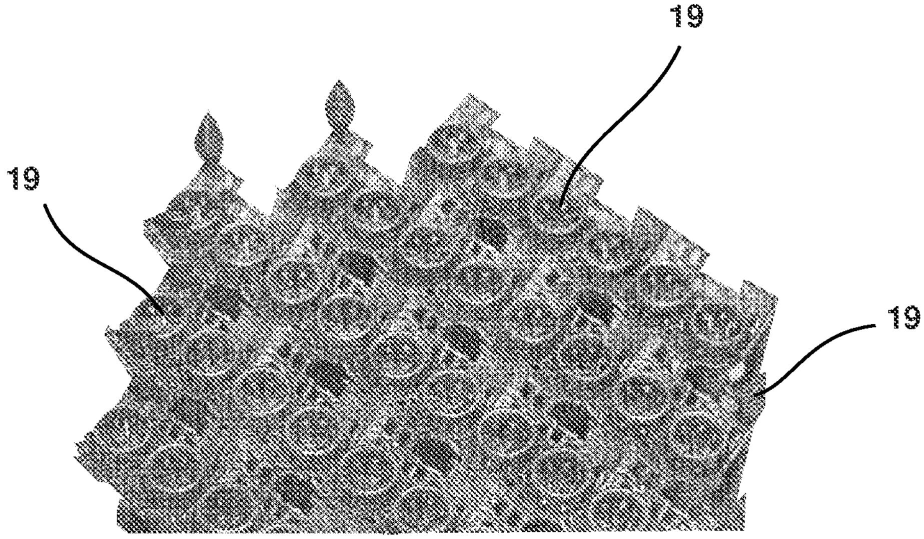
FIG. 5 Illustrates a plurality of coaxial input ports.

FIG. 5 illustrates a plurality of ground plane skirts 28 illustrating the coaxial input ports 19 fabricated together using 3-D manufacturing, prior to assembly with the lattice.

To facilitate 3-D printing with direct metal laser sintering (DMLS), the printing process begins with a flat platform, and the part is built up in 30 μm thick layers.

Figure 8:
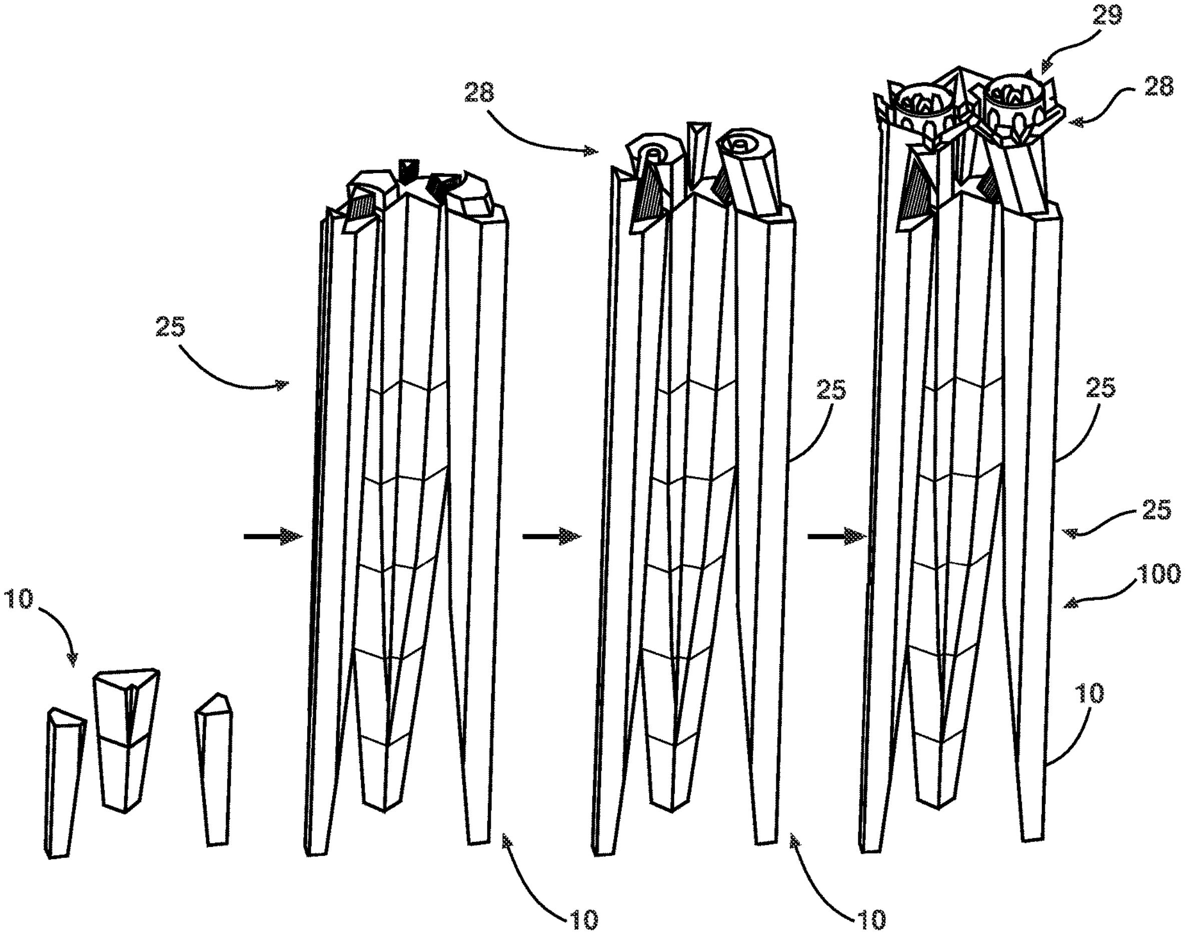
FIG. 8 illustrates one embodiment of 3-D printed array assembly.

The manufacturer prints the antennas 'upside down' with the radiating tips first at the bottom of the structure. Attached to the build platform and the rest of the structure grows upwards from these tips, as shown in FIG. 8. The geometry is self-supporting in the sense that additional support structures between the build platform and the antenna are not necessary to hold up the antenna. Fabricating self-supporting geometry is more reliable since removing the unwanted support structures can be a manual and imprecise process. Since the part is self-supporting, everything must grow upwards and outwards. A rule of thumb for accurate fabrication is that the maximum angle from the vertical direction a part should grow at is roughly 45°. Thus, one design goal is to slowly sweep various geometries to minimize variation from one layer to the next The antenna 100 may include a balun (not shown) that converts the coaxial input connector into the balanced flared notch radiators. Conventional Vivaldi antennas are fed with a Marchand balun. However, Marchand baluns typically have a significant horizontal section that is not amendable to the flared angles required for self-supporting DMLS structures. In one embodiment a tapered transmission line balun such that the flared notch is excited by connecting the coax outer conductor 13 and coax center conductor 11 of the coax feed to the Vivaldi arms (lattice 10).

In one embodiment the outer conductor of the coax feed may be swept outwards at a sweep angle 10 in FIGS. 1 and 20 in FIG. 2. The sweep angle is preferably between 40o and 50 o degrees. Alternatively, the sweep angle may be 45 o to the ground plane. In contrast, conventional ground planes are horizontal which helps maximize the open volume of the Marchand balun and thus maximizes the bandwidth. The ground plane skirt 18 may slightly degrade the low frequency impedance match compared to an ideal horizontal ground plane.

An advantage of present inventions printed ground plane is the simple manufacturing since it is naturally electrically connected to the antenna elements. In contrast, it is common for traditional Vivaldi arrays to require hand soldering or conductive paste to connect the antenna elements to the ground plane.

The ground plane skirt is in one embodiment perforated with less than λH/4 diameter holes which helps reduce weight without sacrificing performance. λH is . . . ? In addition, these holes reduce material stress from large thermal gradients during the laser sintering process when the structure is printed, which in turn results in higher fabrication accuracy.

Since it is not possible to print very large arrays in a single run, it would be an improvement to ensure the design is modular so that subarrays can be combined to scale the array to whatever size is desired.

Additional support structure #? Is designed into the antenna to improve its modularity for 3D printing.

This modular support structure provides another connection between the Vivaldi arms and the ground plane skirt such that all features are mechanically connected.

Figure 7A:
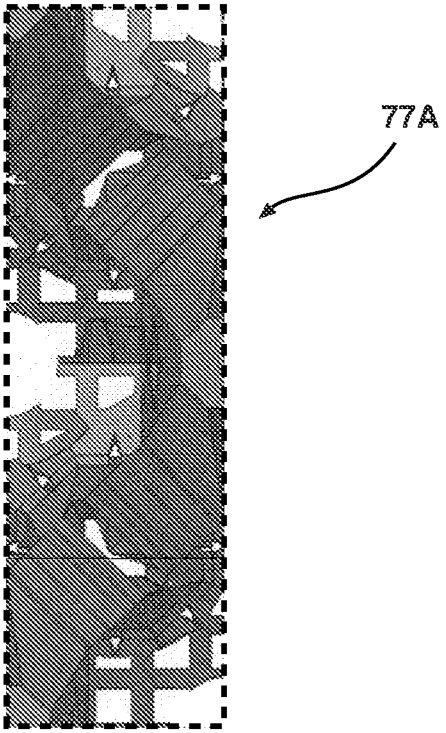
FIG. 7A illustrates a triangular lattice.

The structure in FIG. 7A illustrates a triangular lattice 77A which allows for truncating the array along sections of the unit cell with low current density to minimize the impact of imperfect 'seams' between adjacent subarrays. For example, removing the modular support structure disconnects a disconnected arm from the rest of the structure such that the disconnected arm can be 'free-floating'.

Figure 7B:
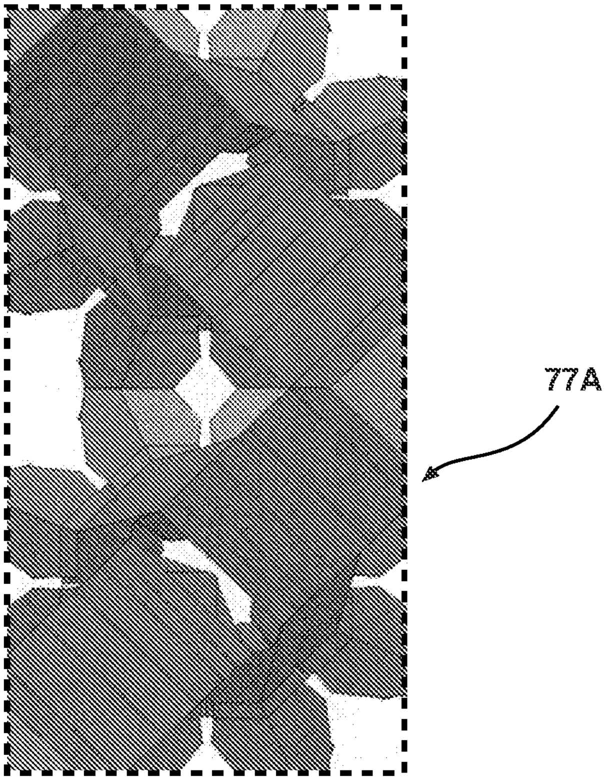
FIG. 7B illustrates a square lattice.

However, the support structure does degrade the low frequency performance. For example, the maximum voltage standing wave ratio (VSWR) without and with this structure is 2.5:1 and 2.9:1, respectively, around 3 GHz for broadside scan on the square lattice array. The structure in FIG. 7B illustrates a square lattice 77B.

The Sub-Miniature Push-on, Micro (SMPM) connectors (19 in FIGS. 1 and 29 in FIG. 2) are printed onto the radiating elements (antenna 100 and antenna 200), which simplifies assembly and reduces cost compared to utilizing discrete RF connectors. The present invention modifies the Vivaldi geometry so that the design is both modular and satisfies the DMLS fabrication design rules. The disclosed process includes multiple array simulations where the arrays are fabricated, and measurements are compared to simulations. Overall, the arrays have similar performance as previous Vivaldi arrays, but with simpler fabrication.

One fabrication process involves 3D printing plastic and then electroplating the entire surface. The designed antennas are intended to be used in large arrays with 100's to 1000's of antenna 11 elements. However, smaller arrays are fabricated, and their performance is compared to simulation to prove the concept.

Figure 6:
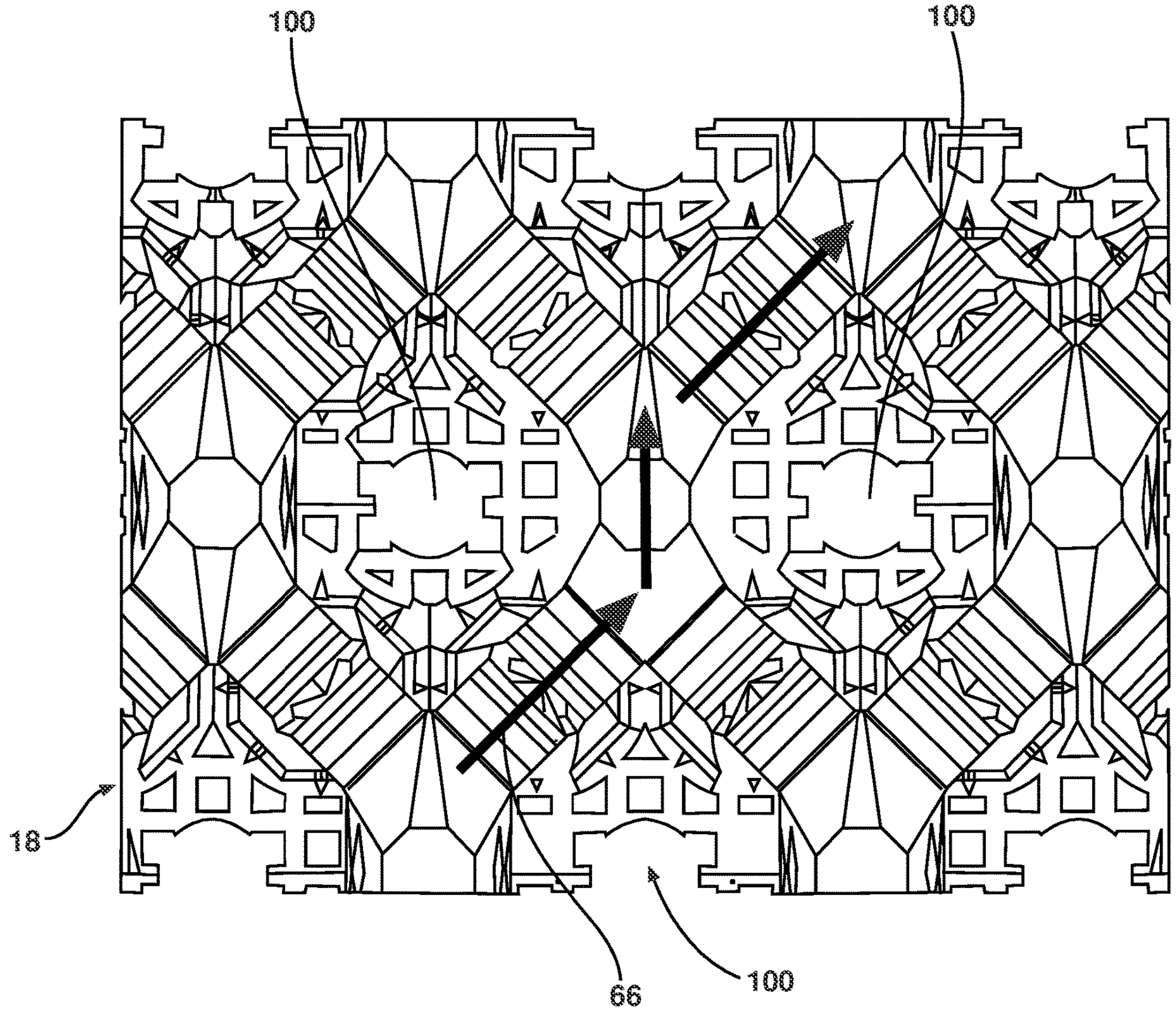
FIG. 6 Illustrates a cross section of the square lattice array in FIG. 2.

A cross sectional view of the fabricated lattice arrays (perforated ground plane skirt 18 (and/or 28) are shown in FIG. 6. The square lattice subarray has a square aperture with 24 dual-polarized elements, while the triangular lattice has a hexagonal aperture with 19 elements. The triangular lattice could easily have been truncated with a rectangular aperture, but a hexagon was chosen to highlight the aperture shape flexibility. In one embodiment there is a slight vertical jog 66J as each row of antennas are offset from the previous row of antennas.

Perforated ground plane skirts may be 3D printed in arrays with titanium (Ti6Al4V) using the GE Additive Concept Laser M2, which can print parts up to 245 mm×245 mm×330 mm in size. Many factors affect cost such as size, weight, and structural support removal time. To give a couple reference points, the arrays from FIG. 6 weigh 97 g and 58 g, respectively. The overall costs of the square and triangular lattice arrays are $1540 and $1120 (USD), respectively. This translates into a price/element of $64 and $59 (USD), respectively. The cost of the antennas can be significantly reduced by further reducing the weight/element, as well as increasing the array size to more efficiently utilize space on the build platform.

FIG. 7A is an exploded cross-sectional view of the perforated ground plane skirt 18 for a triangular array while FIG. 7B is an exploded cross sectional view of the perforated ground plane skirt 28 for a square array.

FIG. 8 illustrates one embodiment of 3-D printed array assembly beginning with the triangular lattice 10, adding the modular support structure 25 and a perforated ground plane skirt 28, followed by the coaxial input ports 29 to complete an array antenna/element 100.

Figure 9:
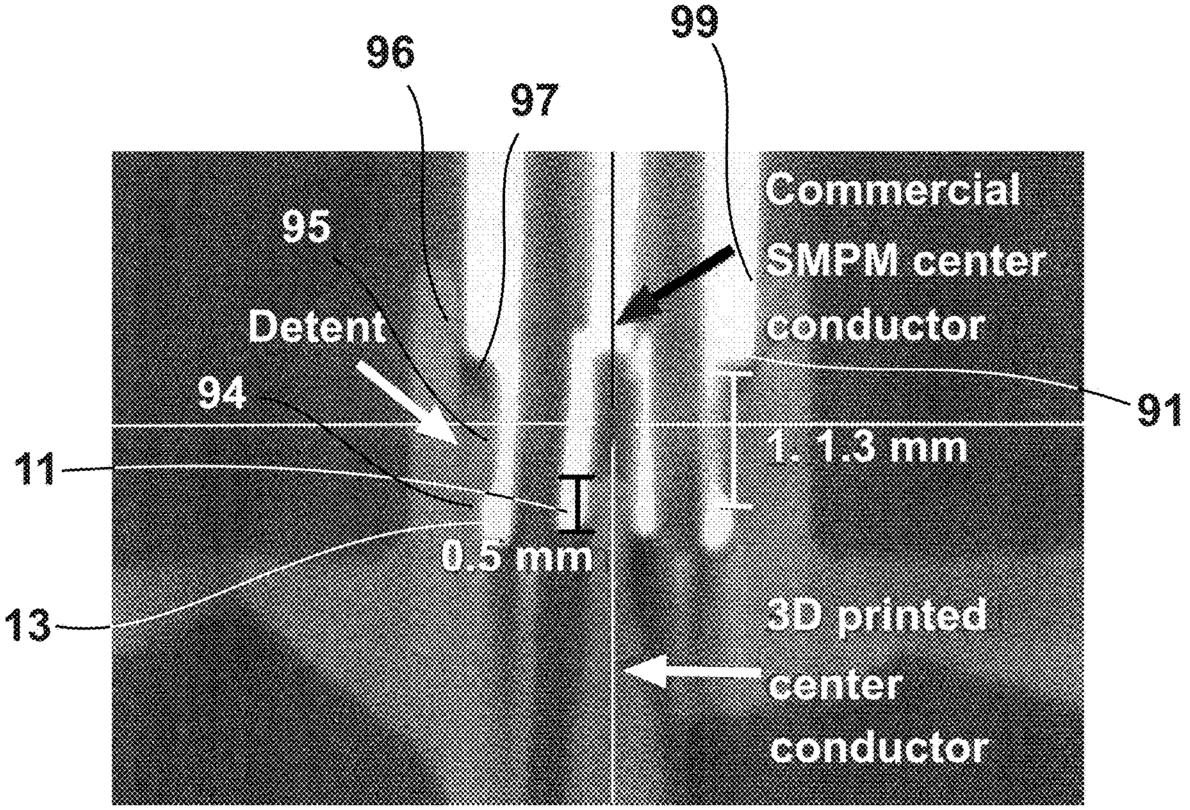
FIG. 9 illustrates a Sub-Miniature Push-on, Micro (SMPM) connector in relation to the SMPM detent.

The 3D printed male SMPM connectors 99 shown in FIG. 9 at the bottom of the antennas have connectors that need to be precisely fabricated so that commercial female SMPM connectors such that they may mechanically snap into the socket while also ensuring there is good electrical contact. A detent 91 in the connector 99 helps ensure a good connection is maintained if there is some vibration or stress on input cables (not shown). The detent includes a raised central portion 95, a proximal undercut portion 94, and a distal relief portion 96 with respect to a longitudinal axis of the connector 99. The raised central portion 95 of the detent 99 corresponds to a female socket 97 of the commercial female SMPM connectors. The raised central portion 95 projects radially inward from an inner surface of the connector to create shoulders with the proximal undercut portion 94 and the distal relief portion 96. The proximal undercut portion 94 defines a retention shoulder, which resists axial withdrawal of the male connector once engaged. The distal relief portion 96 provides clearance and/or a sloped surface that facilitates snap-in engagement of the male connector during insertion. The female socket 97 defines a recess dimensioned to receive the raised central portion 95 of the detent 91. When the male connector is fully inserted, the raised central portion 95 is seated within the recess and the interaction between the undercut and the recess's engagement face resists disengagement via both axial (longitudinal) and torsional (rotational) movement enabling positive locking engagement. FIG. 9 illustrates a SMPM connector 99 in relation to the SMPM detent 91 and a 3-D printed coax center conductor 11.

There are generally slight differences between the Computer Aided Design (CAD) models sent to the printer and the fabricated parts. Therefore, several iterations may be needed to define the preferred design match.

This iterative process resulted in connectors with fabricated dimensions that are accurate enough for a good but not perfect connection to commercial SMPM connectors. Ideal SMPM connectors have a center conductor diameter of 0.3 mm. However, the measured center conductor diameter of the 3D printed part is 0.4 mm, which roughly corresponds to the minimum feature size of the standard resolution titanium printer we used.

The center conductor of the commercial connector preferably flexes to allow the thicker-than-ideal 3D printed pins to fit inside. The center conductor of the 3D printed pin may engage roughly 0.5 mm inside the center conductor of the commercial SMPM connector. In contrast, connections between two commercial SMPM connectors may have an engagement around 0.8 mm. We found that printing connectors with larger than 0.5 mm engagement tended to damage the commercial female connector because the center conductor flexed too much to make room for the thick 3D printed pin. The reduced engagement in our design generally reduces the robustness to misalignment errors but is still satisfactory for our purposes. For example, FIG. 7(*c*) plots measured the reflection coefficients of the 25 ports in the square lattice that are not located along the outermost edge. All unfed ports are terminated with 50Ω loads. The overlapping curves in this figure illustrate the repeatability of these coaxial connections across the array. Note that this figure does not plot the active impedance match, and thus does not have a low reflection coefficient across the operating band.

Higher resolution printers with feature sizes around 0.15 mm are also available, which corresponds to a roughly 2× better resolution than the printer we used. However, higher resolution parts are generally more expensive and the maximum part size is smaller. In the future, these higher resolution printers could be used to improve the reliability of the SMPM connectors. Furthermore, they would allow the designs to be scaled up in frequency. It is likely our design could be scaled to operate up to 40 GHz using one of these printers with 2× better resolution. It should also be emphasized that significant investment is being put into 3D printing technologies which will likely improve the cost, maximum part sizes, and printing resolution of future designs. That said, a connectorized array would have other issues at frequencies as high as 40 GHz since we are not aware of any commercial RF connectors that are small enough to fit within a 40 GHz λ/2 lattice. A 40 GHz dual polarized square lattice may require two connectors to fit within about 3.75 mm×3.75 mm unit cell area.

The disclosed additively manufactured Vivaldi arrays on square and triangular lattices are designed to operate at 3-20 GHz and scan angles out to 60o from normal. The present invention teaches how to modify the Vivaldi geometry so that the design is both modular and satisfies the DMLS fabrication design rules. In one embodiment the SMPM connector(s) may be directly printed with the antenna. The cost of these arrays with integrated connectors is roughly equal to the cost of commercial SMPM connectors alone. Furthermore, removing the additional step of soldering connectors at every element reduces cost and potentially improves reliability. Overall, the performance of the square and triangular lattice versions is similar, with the main difference being the triangular lattice has a max gain that is 0.6 dB higher than the square lattice for a given number of elements. However, the triangular lattice array does have higher cross-polarization levels when scanning in the principal planes. There is good agreement between measurement and simulation data which illustrates the accuracy of the fabrication process. Additively manufactured arrays are particularly useful for research and development where the antenna can be customized for a given application, and then cheaply and rapidly manufactured.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A 3-D printable dual-polarized Vivaldi array including:

a plurality of Vivaldi antennas, at least one of the Vivaldi antennas displaying characteristics including:

a monolithic 3-D printed modular construction;

a plurality of Sub-Miniature Push-on, Micro (SMPM) connectors forming a plurality of ground plane skirts supporting a lattice, each SMPM connector having a detent, the detent comprising a raised central portion, a proximal undercut portion, and a distal relief portion;

a support structure between the lattice and at least one ground plane skirt;

and the ground plane skirt having a skirt swept forward angle of 40 to 60 degrees.

2. The 3-D printable Vivaldi array of claim 1 wherein a tapered transmission line balun further connects the Vivaldi antennas with their respective ground plane skirts.

3. The 3-D printable Vivaldi array of claim 1 wherein the plurality of ground plane skirts are 3-D printed metal.

4. The 3-D printable Vivaldi array of claim 3 wherein the plurality of ground plane skirts are 3-D printed using direct metal laser sintering (DMLS).

5. The 3-D printable Vivaldi array of claim 1 wherein a Marchand balun further connects the Vivaldi antennas with their respective ground plane skirts.

6. The 3-D printable Vivaldi array of claim 1 wherein the plurality of ground plane skirts are metal.

7. The 3-D printable Vivaldi array of claim 1 further including a tapered transmission line balun that converts a coaxial input connector into a balanced flared notch radiator.

8. A 3-D printable dual-polarized Vivaldi array manufacturing process comprising manufacturing:

a plurality of Vivaldi antennas utilizing a monolithic 3-D printed modular construction;

a plurality of Sub-Miniature Push-on, Micro (SMPM) connectors forming a plurality of ground plane skirts supporting a lattice, each SMPM Connector having a detent, the detent comprising a raised central portion, a proximal undercut portion, and a distal relief portion;

a support structure between the lattice and the ground plane skirts, each of the ground plane skirts having a skirt swept forward angle of 40 to 60 degree printable Vivaldi array, wherein a 3-D printed triangular lattice has added a 3-D printed modular support structure and a perforated ground plane skirt; and adding at least one coaxial input port to complete the 3-D printable Vivaldi array.

9. The 3-D printable Vivaldi array manufacturing process of claim 8 wherein the ground plane skirts are 3-D printed metal.

* * * * *